US011188074B1

(12) United States Patent
Benavidez et al.

(10) Patent No.: US 11,188,074 B1
(45) Date of Patent: Nov. 30, 2021

(54) SYSTEMS AND METHODS FOR REMOTELY CONTROLLING OPERATION OF A VEHICLE

(71) Applicant: UIPCO, LLC, San Antonio, TX (US)

(72) Inventors: Andy Benavidez, San Antonio, TX (US); Jessica Gisela Ellinor Nunn, Austin, TX (US); Michael Livingston, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 117 days.

(21) Appl. No.: 16/204,291

(22) Filed: Nov. 29, 2018

Related U.S. Application Data (60) Provisional application No. 62/592,173, filed on Nov. 29, 2017.

(51) Int. Cl.
  *G05D 1/00* (2006.01)
  *B60W 40/08* (2012.01)
  *G06K 9/00* (2006.01)

(52) U.S. Cl.
  CPC .......... *G05D 1/0038* (2013.01); *B60W 40/08* (2013.01); *G05D 1/0022* (2013.01); *G05D 1/0044* (2013.01); *G05D 1/0061* (2013.01); *G05D 1/0088* (2013.01); *G06K 9/00845* (2013.01); *B60W 2040/0818* (2013.01); *B60W 2040/0872* (2013.01); *G05D 2201/0213* (2013.01)

(58) Field of Classification Search
  CPC .. G05D 1/0038; G05D 1/0022; G05D 1/0044; G05D 1/0061; G05D 1/0088; G05D 2201/0213; B60W 40/08; B60W 2040/0818; B60W 2040/0872; G06K 9/00845
  See application file for complete search history.

(56) References Cited

U.S. PATENT DOCUMENTS

| | | | | |
|---|---|---|---|---|
| 10,328,897 | B1 * | 6/2019 | Nabbe | G06F 21/305 |
| 2014/0207535 | A1 * | 7/2014 | Stefan | G07C 5/008 705/7.42 |
| 2015/0371456 | A1 * | 12/2015 | Moore, Jr. | G06K 9/00832 701/1 |
| 2016/0139594 | A1 * | 5/2016 | Okumura | B60W 30/00 701/2 |
| 2017/0161576 | A1 * | 6/2017 | Banno | G08B 21/02 |
| 2017/0329329 | A1 * | 11/2017 | Kamhi | G06K 9/00604 |
| 2018/0011485 | A1 | 1/2018 | Ferren | |

OTHER PUBLICATIONS

Metz, Rachel, "I rode in a car in Las Vegas that was controlled by a guy in Silicon Valley," Intelligent Machines, MIT Technology Review, Jan. 11, 2018, https://www.technologyreview.com/s/609937/i-rode-in-a-car-in-las-vegas-its-driver-was-in-silicon-valley/.

* cited by examiner

*Primary Examiner* — Tyler J Lee
*Assistant Examiner* — Yufeng Zhang
(74) *Attorney, Agent, or Firm* — Fletcher Yoder, P.C.

(57) ABSTRACT

A system includes one or more processors that are configured to receive data from one or more sensors, to determine whether one or more characteristics of a driver or an occupant indicate driving control of a vehicle should transfer from the driver based on the data, and to enable a remote operator to control operation of the vehicle in response to determining that the driving control should transfer from the driver.

20 Claims, 4 Drawing Sheets

SYSTEMS AND METHODS FOR REMOTELY CONTROLLING OPERATION OF A VEHICLE

CROSS-REFERENCE TO RELATED APPLICATION

This application claims priority to and the benefit of U.S. Provisional Application No. 62/592,173, entitled "SYSTEMS AND METHODS FOR REMOTELY CONTROLLING OPERATION OF A VEHICLE," filed Nov. 29, 2017, which is hereby incorporated by reference in its entirety for all purposes.

BACKGROUND

The present disclosure relates generally to systems and methods for remotely controlling operation of a vehicle. More specifically, the present disclosure relates to systems and methods for transferring control of the vehicle from a driver within the vehicle to a remote operator under certain conditions.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

A driver (e.g., human operator) may operate a vehicle to travel from one location to another. Furthermore, some vehicles are autonomous vehicles and include a vehicle control system that is capable of controlling driving operations of the vehicle as the vehicle travels to a destination. However, regardless of how apt the vehicle control system may be at driving the vehicle, the driver may prefer to control operation of the vehicle. It is presently recognized that drivers of vehicles, including autonomous vehicles, may occasionally experience situations in which additional driving assistance would be beneficial.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system includes one or more processors that are configured to receive data from one or more sensors, to determine whether one or more characteristics of a driver or an occupant indicate driving control of a vehicle should transfer from the driver based on the data, and to enable a remote operator to control operation of the vehicle in response to determining that the driving control should transfer from the driver.

In one embodiment, a system includes one or more processors that are configured to receive data from one or more sensors, to determine whether one or more characteristics of a driver or an occupant of a vehicle indicates driving assistance is needed based on the data, and to activate an autonomous driving mode of the vehicle in response to determining that the driving assistance is needed. The one or more processors are also configured to enable a remote operator to monitor operation of the vehicle in the autonomous driving mode.

In one embodiment, a method includes receiving, at one or more processors, data from one or more sensors. The method also includes determining, via the one or more processors, whether one or more characteristics of a driver or an occupant of a vehicle indicate driving assistance is needed based on the data. The method further includes enabling, via the one or more processors, a remote operator to control or to monitor operation of the vehicle in response to determining that the driving assistance is needed.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A driver (e.g., human operator) may operate a vehicle to travel from one location to another. However, drivers may occasionally experience situations in which driving assistance is beneficial. Accordingly, the disclosed embodiments generally relate to a driving system that monitors characteristics of the driver (e.g., monitors heart rate via a heart rate sensor, breathing rate via a breathing sensor, eye movement via an imaging sensor) and/or other characteristics indicative of desired assistance while the driver is operating the vehicle. In some embodiments, the driving system may enable communication between a remote operator (e.g., remotely-located human operator) and the driver in response to determining that the monitored characteristics indicate driver assistance is desirable. In such cases, the remote operator may ask questions, provide advice, and the like to assess whether the driver could use assistance or whether driving control of the vehicle should be transferred. If it is determined that driving control should be transferred, the remote operator may take over control of the vehicle using a remote control station. For example, the remote control station may include a screen that displays images of an area surrounding the vehicle, as well as a steering wheel or other input that enables the remote operator to steer the vehicle, pedals or other inputs that enable the remote operator to control a speed of the vehicle, and various other inputs that enable the remote operator to control other features of the vehicle. The remote operator may control the vehicle to drive to a desired location (e.g., a shoulder of a road, a nearby parking lot, a hospital) and/or may contact an appropriate person (e.g., a designated contact identified by the driver or a services representative).

Some vehicles are autonomous vehicles that include a vehicle control system that is capable of controlling driving operations of the vehicle as the vehicle travels to a destination. However, regardless of how apt the vehicle control system may be at driving the vehicle, the driver may prefer to control the operation of the vehicle. Thus, such autonomous vehicles may operate in a non-autonomous (e.g., default or standard) mode in which the driver controls operation of the vehicle until the monitored characteristics indicate driver control should be transferred. If the monitored characteristics indicate that control should be transferred from the driver, the driving system may activate an autonomous driving mode in which the vehicle control system controls operation of the vehicle. Additionally or alternatively, the driving system may enable communication with the remote operator. If the remote operator determines that conditions are appropriate, the remote operator may monitor operation of the vehicle while the vehicle control system drives the vehicle in the autonomous driving mode. In some cases, the remote operator may work with the vehicle control system and/or be on standby to take over control of the vehicle. For example, the remote operator may provide an input of a location (e.g., a gas station) to the vehicle control system and view a screen that displays images of an area surrounding the vehicle to ensure that the vehicle control system controls the vehicle in an appropriate manner (e.g., to the correct location, following traffic rules, avoiding other vehicles) as the vehicle travels to the location. In this way, the driving system may actively monitor the driver, block the driver from operating the vehicle in an undesired manner, and assist the driver to reach a destination. In some cases, the driving system may assist the driver upon request by the driver. Additional details with regard to controlling the operation of the vehicle will be discussed below with respect to FIGS. 1-4.

Figure 1:
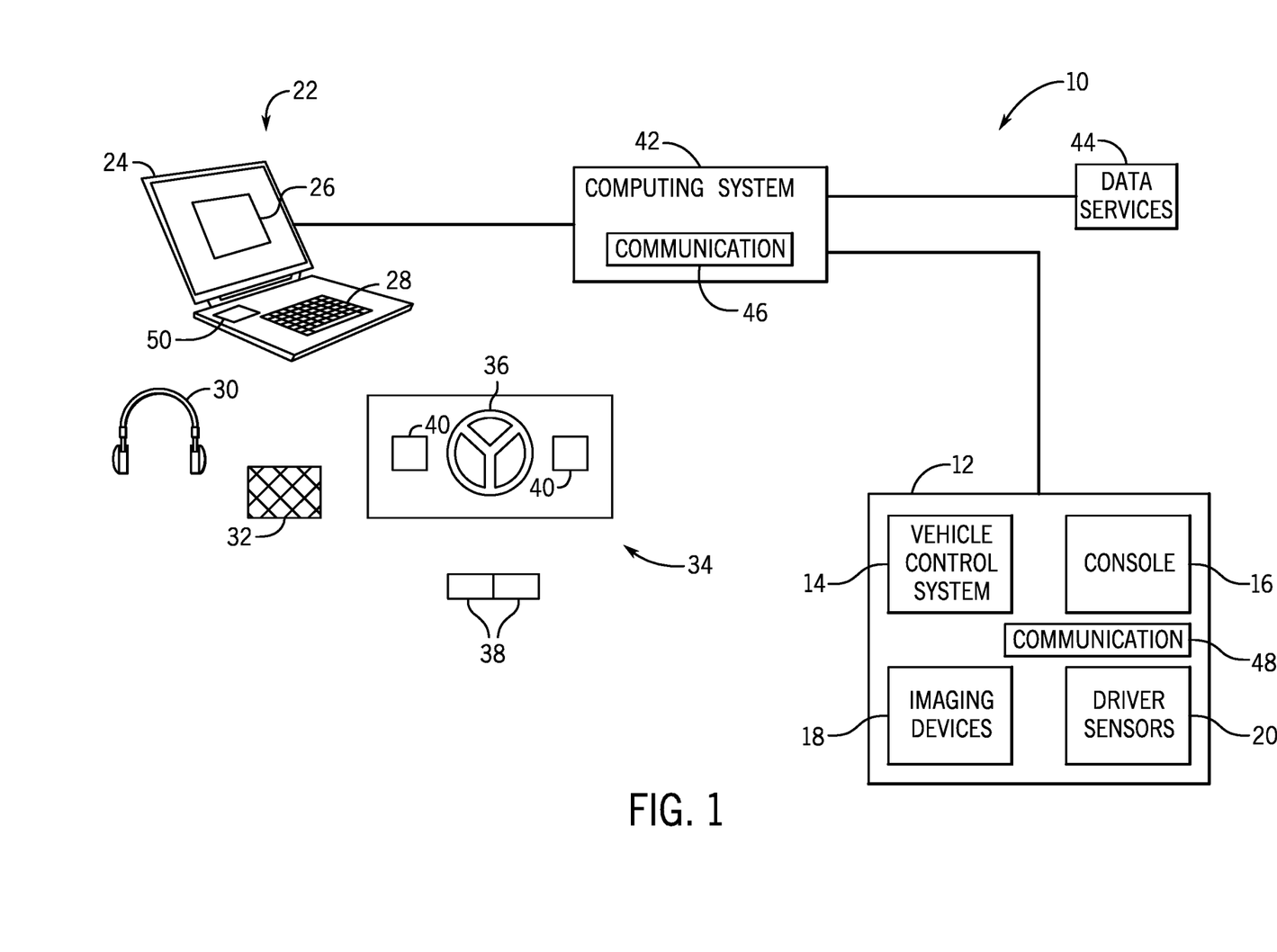
FIG. 1 illustrates a block diagram of a driving system that may be used to control operation of a vehicle, in accordance with embodiments described herein.

With the foregoing in mind, FIG. 1 illustrates a block diagram of a driving system 10 that may control operation of a vehicle 12. As shown, the driving system 10 includes the vehicle 12, which may include a vehicle control system 14, a console 16, one or more imaging devices 18 (e.g., cameras), and one or more sensors 20 (e.g., driver and/or occupant sensors). The driving system 10 also includes a remote control station 22 (e.g., remotely-located from the vehicle 12), which may include a variety of processing and user interface components, such as a personal computing system 24 having a display screen 26, an input device 28 (e.g., keyboard), a headset 30, and a microphone 32. The illustrated remote control station 22 also includes a dashboard assembly 34, which includes a steering wheel 36, pedals 38, and other inputs 40 to enable a remote operator to control the vehicle 12. As shown, the driving system 10 also includes a computing system 42 that is communicatively coupled to the vehicle 12 (e.g., the vehicle control system 14 of the vehicle 12) and the remote control station 22 (e.g., the personal computer system 24 of the remote control station 22). It should be appreciated that the vehicle 12 may be any suitable vehicle (e.g., car, van, truck, bus, farming equipment, construction equipment). As discussed in more detail below, the vehicle 12 may be partially or fully controlled and operated via a processor-based device, such as a vehicle control system 14. The remote-control station 22 may be part of a call center with multiple remote-control stations 22 that may be used to communicate with multiple drivers and/or control multiple vehicles 12 simultaneously.

The console 16 of the vehicle 12 may include a touchscreen display, other input devices (e.g., buttons or knobs), a speaker, and a microphone, for example. The imaging devices 18 may be positioned about the vehicle 12 to obtain images outside the vehicle 12 and/or within the vehicle 12. The imaging devices 18 may provide images that indicate the identity of the driver and/or occupant, a state of the driver and/or occupant (e.g., awake, asleep, conscious, unconscious, posture), the settings of various equipment within the vehicle 12, and the like. The imaging devices 18 may also enable monitoring of the driving of the vehicle 12 with respect to the road, such as provide an indication of whether the vehicle 12 is being driven within appropriate lanes and not drifting between lanes during the drive, for example. In some embodiments, one or more of the imaging devices 18 may be supported within a rear-view mirror mounted to the windshield or otherwise suspended within the cabin of the vehicle near the windshield to provide images of the road and environment in front of the vehicle 12. The imaging devices 18 may be capable of obtaining images in varying lights (e.g., day and night; night vision cameras). The images obtained by the imaging devices 18 may be processed by the computing system 42 and may be provided to the remote operator via the display screen 26 of the personal computing system 24 to provide more information about the driver and/or to assist the remote operator to control the vehicle 12.

The one or more sensors 20 may include any suitable sensing device capable of detecting various characteristics of the driver and/or occupant of the vehicle 12. For instance, the sensors 20 may include a heart rate sensor capable of detecting a heart rate of the driver and/or occupant, a breathing rate sensor capable of detecting a breathing rate of the driver and/or occupant, a contact sensor capable of detecting a touch at the contact sensor, an image sensor capable of detecting eye movement, or a combination thereof. It should be appreciated that any of a variety of other sensors that are capable of detecting characteristics of the driver and/or occupant that indicate that driving assistance is desired or that driving control should be transferred may be utilized in addition to or instead of the sensors specifically noted above. Furthermore, the one or more imaging device 18 may be utilized as sensors to monitor characteristics of the driver and/or occupant. For example, images of the driver and/or occupant obtained by the one or more imaging device 18 may be analyzed (e.g., via template matching or computer vision techniques carried out by the computing system 42) to determine whether driving control should be transferred. The sensors 20 may be positioned at various locations within the vehicle 12, such as the steering wheel, dashboard, seat, armrest, mirrors, and the like. In certain embodiments, the sensors 20 may be disposed on devices carried by or worn by the driver and/or occupant. For example, the sensors 20 may be disposed on mobile phones, wearable electronics (e.g., wristbands or chest straps), and the like.

In operation, the computing system 42 may receive data from the imaging devices 18 and/or the sensors 20, and may process the data (e.g., via one or more algorithms) to determine whether driving assistance is desired or whether driving control should be transferred. For example, cardiac arrhythmias (e.g., tachycardia, bradycardia), a change in heart rate, or absence of a heart beat may indicate that driving assistance is needed due to a medical condition (e.g., the driver's heart may stop beating after a heart attack, the driver's heart rate may decrease while drowsy or asleep, or the driver's heart rate may increase during a seizure). Similarly, abnormal breathing rates (e.g., hyperventilation, tachypnea, bradypnea), a change in breathing rate, or an absence of breath may indicate that driving assistance is needed due to a medical condition (e.g., the driver's breathing rate may decrease if the driver is asleep or choking, or the driver's breathing rate may increase during a panic attack). It should be appreciated that the heart rate and/or breathing rate may also be affected if the driver is under the influence of medications or other substances. Thus, if the heart rate sensor indicates that the driver's heart rate is outside of a heart rate range and/or if the breathing rate sensor indicates that the driver's breathing rate is outside of a breathing rate range, the computing system 42 may determine that driving assistance is desired or that driving control should be transferred from the driver.

In some embodiments, the computing system 42 may determine that driving assistance is desired or that driving control should be transferred if the driver's heart rate falls outside of the heart rate range for a predetermined period of time (e.g., more than 10, 15, 30, 60, or 90 seconds) and/or if the driver's breathing rate falls outside of the breathing rate range for a predetermined period of time (e.g., more than 10, 15, 30, 60, or 90 seconds). Furthermore, in some embodiments, the computing system 42 may determine or access a baseline heart rate and/or a baseline breathing rate for the driver and/or the occupant, and may set the heart rate range and/or the breathing rate range based on the respective baseline measurements. The baseline measurements may be received by the computing system 42 at the beginning of a driving trip (e.g., when the driver turns on the vehicle 12) or prior to the driving trip (e.g., via the console 16 or via a personal device, such as a mobile phone, that is configured to communicate with the computing system 42) while the driver and/or occupant is resting. As such, the heart rate range and/or the breathing rate range may be personalized for and unique to the driver and/or occupant.

The computing system 42 may additionally or alternatively receive and process various other types of data to determine whether driving assistance is desired or whether driving control should be transferred. For example, abnormal grip on a steering wheel, a change in the grip on the steering wheel, or absence of the grip on the steering wheel may indicate that driving assistance is desired or that control should be transferred due to a medical condition (e.g., the driver's hands may separate from the steering wheel or the grip may loosen when the driver falls asleep, is choking, or experiencing a seizure or heart attack). It should be appreciated that the driver's grip on the steering wheel may also be affected if the driver is under the influence of medications or other substances. To monitor the driver's contact with the steering wheel, the steering wheel may include one or more contact sensors capable of detecting a touch or measuring pressure (e.g., due to a strength of grip on the steering wheel). Thus, if the contact sensor indicates that the driver is not contacting the steering wheel or if the pressure is outside of a pressure range, the computing system 42 may determine that driving assistance is desired or that driving control should be transferred.

In some embodiments, the computing system 42 may determine that driving assistance is desired or that driving control should be transferred if the driver does not contact the steering wheel for a predetermined period of time (e.g., more than 10, 15, 30, 60, or 90 seconds) or if the pressure is outside of the pressure range for a predetermined period of time (e.g., more than 10, 15, 30, 60, or 90 seconds). Furthermore, in some embodiments, the computing system 42 may determine or access a baseline pressure (e.g., a pressure typically applied during driving operations) for the driver, and may set the pressure range based on the baseline measurement. The baseline measurement may be obtained at the beginning of a driving trip (e.g., when the driver turns on the vehicle 12 or within the first 1, 2, 3, 4, or 5 minutes) or during prior driving trips. As such, the pressure range may be personalized for and unique to the driver.

The computing system 42 may additionally or alternatively receive and process data related to eye movement (e.g., movement of the eye and/or blinks of the eyelid). For example, abnormal eye movement, a change in eye movement, or absence of eye movement may indicate that driving assistance is desired or that driving control should be transferred due to a medical condition (e.g., the driver's eyes may close during sleep or during certain types of seizures, or the driver may demonstrate a lack of eye movement when unconscious). It should be appreciated that the eye movement may also be affected if the driver is under the influence of medications or other substances. Thus, if the image sensor indicates that the driver's eye movement is outside of an acceptable pattern or range (e.g., rate) of eye movements, the computing system 42 may determine that driving assistance is needed or that driving control should be transferred.

In some embodiments, the computing system 42 may determine that driving assistance is desired or that driving control should be transferred if the driver does not demonstrate any eye movement for a predetermined period of time (e.g., more than 10, 15, 30, 60, or 90 seconds) or if the eye movement is outside of the acceptable pattern or range for a predetermined period of time (e.g., more than 10, 15, 30, 60, or 90 seconds). Furthermore, in some embodiments, the computing system 42 may determine or access baseline eye movement data (e.g., a pattern or range typical during driving operations) for the driver, and may set the pattern or range based on the baseline measurement. The baseline measurement may be obtained at the beginning of a driving trip (e.g., when the driver turns on the vehicle 12 or within the first 1, 2, 3, 4, or 5 minutes) or during prior driving trips. As such, the eye movement pattern or range may be personalized for and unique to the driver.

As noted above, the one or more imaging device 18 may additionally or alternatively be utilized as sensors to monitor characteristics of the driver and/or occupant. For example, images of the driver obtained by the one or more imaging device 18 may be analyzed (e.g., via template matching or computer vision techniques carried out by the computing system 42) to determine that driving assistance is desired or that driving control should be transferred. For example, abnormal body position, a change in body position, or absence of body movement may indicate that driving assistance is desired or that driving control should be transferred due to a medical condition (e.g., the driver may slump during sleep or when unconscious, the driver may stiffen or shake during a seizure, the driver may place their hands at their throat when choking). It should be appreciated that the body position may also be affected if the driver is under the influence of medications or other substances. Thus, if the imaging device 18 indicates that the driver's body position does not match an acceptable position (or matches an unacceptable position), the computing system 42 may determine that driving assistance is needed or that driving control should be transferred.

In some embodiments, the computing system 42 may determine that driving assistance is needed or that driving control should be transferred if the driver does not demonstrate an acceptable body position for a predetermined period of time (e.g., more than 10, 15, 30, 60, or 90 seconds). Furthermore, in some embodiments, the computing system 42 may determine or access baseline body position data (e.g., a body position typical during driving operations) for the driver, and may set the acceptable position based on the baseline body position data. The baseline body position data may be obtained at the beginning of a driving trip (e.g., when the driver turns on the vehicle 12 or within the first 1, 2, 3, 4, or 5 minutes) or during prior driving trips. As such, the acceptable body position may be personalized for and unique to the driver.

As noted above, the sensors 20 disclosed herein are not intended to be exhaustive, and it should be appreciated that various other types of sensors and data may be collected and provided to the computing system 42 to determine whether driving assistance is desired or whether driving control should be transferred. For example, the computing system 42 may receive vehicle speed data from a speed sensor (e.g., the driver may apply more or less pressure to an accelerator when asleep or due to certain medical events), pressure data from a pressure sensor within a driver's seat (e.g., the driver may slump over a center console when asleep or due to certain medical events, thereby reducing pressure on the driver's seat), images from imaging devices 18 that indicate whether the vehicle 12 is staying within a lane or following another vehicle too closely, and the like.

It should be appreciated that the computing system 42 may determine that driving assistance is desired or that driving control should be transferred when one or more types of data are outside of the respective ranges or patterns. For example, the computing system 42 may determine that driving assistance is needed if one or more of the heart rate or breathing rate are outside of respective ranges. In some embodiments, each of the different types of data are input into an algorithm that calculates whether driving assistance is needed. For example, the computing system 42 may determine that driving assistance is needed based on analysis of the combination of the heart rate, the breathing rate, and the eye movement.

The computing system 42, the vehicle 12, and the remote-control station 22, may communicate via various communication devices and technologies. In particular, one or more communication devices 46 of the computing system 42 may transmit data to (e.g., driving instructions) and/or receive data from (e.g., data obtained by the imaging devices 18 and/or the sensors 20) one or more communication devices 48 within the vehicle 12. In some embodiments, the communication devices 46, 48 may provide multiple types of communication (e.g., redundant communication) to facilitate communication regardless of the location of the vehicle 12 (e.g., city driving, highway driving in remote locations) and/or even if one of the communication networks (e.g., the cellular communication network) is unavailable. For example, the one or more communication devices 46 may include one device configured to communicate via a cellular network (e.g., 3G, 4G, 5G, or a combination thereof) and/or one device configured to communicate via a satellite network, and the one or more communication devices 48 may include one device configured to communicate via a cellular network (e.g., 3G, 4G, 5G, or a combination thereof) and/or one device configured to communicate via a satellite network. Furthermore, the one or more communication devices 46 of the computing system 42 may transmit data to (e.g., data obtained by the imaging devices 18 and/or the sensors 20) and/or receive data from (e.g., driving instructions) one or more communication devices 50 within the remote-control station 22. The communication devices 46, 50 may communicate via a wired or any suitable wireless network (e.g., cellular network, satellite network). In this way, the data may be transferred from the location of the vehicle 12 to the computing system 42 to enable the computing system 42 to determine whether driving assistance is desired or whether driving control should be transferred. Additionally, the remote operator and the driver of the vehicle 12 may communicate with one another and/or the remote operator may control the vehicle 12.

In operation, in response to determining that driving assistance is needed or that driving control should be transferred, the computing system 42 may alert the remote operator at the remote control station 22 and enable the remote operator to communicate with the driver within the vehicle 12. In some embodiments, the computing system 42 may be configured to selectively connect the vehicle 12 to an appropriate remote operator. For example, the computing system 42 may receive or access information about the vehicle 12, the driver, and/or the location of the vehicle 12. This information may include a type of vehicle (e.g., car, van, truck, bus, farming equipment, construction equipment), a type of driver's license required to operate the vehicle (e.g., a commercial driver's license [CDL]), a language spoken by the driver, and a location of the vehicle 12. The computing system 42 may then send the alert and establish communication between the vehicle 12 and the remote operator with appropriate experience (e.g., with the type of vehicle and/or the location), driver's license, and/or other characteristics (e.g., language).

In some embodiments, the computing system 42 may be configured to determine a level (e.g., index or score) based on the data (e.g., lack of heart beat, lack of breaths, lack of eye movement, and lack of grip may receive a relatively higher score, while high heart beat alone may receive a relatively lower score). The data and/or the level may be provided to the remote operator (e.g., via the display screen 26 of the remote control station 22) and may be used to inform communications with drivers.

In some embodiments, in response to determining that driving assistance is desired or that driving control should be transferred, the computing system 42 may instruct the vehicle control system 14 to provide an output (e.g., automated or prerecorded output) via the console 16. For example, the computing system 42 may instruct the vehicle control system 14 to ask the driver a question via the speaker. If a response to the question is not detected, the computing system 42 may then enable the remote operator to communicate with the driver within the vehicle 12 and may also provide information to the remote operator to notify the remote operator that the driver within the vehicle is non-responsive. If a response to the question is detected, the computing system 42 may not enable the remote operator to communicate with the driver within the vehicle 12, or may enable the communication, while also providing information to the remote operator to notify the remote operator that the driver within the vehicle 12 is responsive.

While the above examples relate to using the computing system 42 to determine whether driving assistance is desired or whether driving control should be transferred, it should be appreciated that the vehicle control system 14 may be configured to determine whether driving assistance is needed or to carry out any of the processing steps disclosed herein. For example, in such cases, the vehicle control system 14 may receive and process the data from the sensors 20, and then send a signal indicating that driving assistance is desired to the computer system 42 to initiate communication between the remote operator at the remote control station 22 and the driver within the vehicle 12.

Once communication between the remote operator at the remote control station 22 and the driver within the vehicle 12 is enabled, the remote operator may convey audible messages via the microphone 32, which may be output to the driver via the speaker of the console 16. The driver may provide an audible response via a microphone within the console 16, which may be output to the remote operator via the headset 30. In this way, the remote operator may communicate with the driver to gather information about the driver's condition and to assess the driver's ability to operate the vehicle 12.

The remote operator may determine whether to disconnect communications with the driver, whether to maintain communications with the driver, or whether to take over control of the vehicle 12. For example, if the driver provides a response that indicates that the driver should maintain control of the vehicle 12, the remote operator may provide an input (e.g., via the input device 28 of the remote control station 22) to disconnect communications with the driver. However, if the remote operator is uncertain, the remote operator may continue to communicate with the driver and may be on standby to immediately take over control of the vehicle 12. Furthermore, if the driver requests that the remote operator assist the driver or if the remote operator determines that driving control should be transferred, the remote operator may assume control of the vehicle 12 (e.g., transfer of control may be carried out upon receipt of an input via the input device 28 of the remote control station 22) and may remotely drive the vehicle 12 using the components provided at the remote control station 22. For example, images of the area surrounding the vehicle 12 may be obtained by the imaging devices 18 and displayed on the display screen 26. The remote operator may turn the steering wheel 36 to steer the vehicle 12, depress pedals 38 to adjust the speed of the vehicle 12, use the inputs 40 to turn on headlights, turn on windshield wipers, roll up windows, turn down the radio, and the like. The remote operator may drive the vehicle 12 to a location (e.g., a shoulder of a road, a nearby parking lot, a business) and/or may contact an appropriate person (e.g., a contact identified by the driver).

In some embodiments, the computing system 42 may assist the remote operator to determine whether to transfer control of the vehicle 12 and/or may assist the remote operator to control the vehicle 12. For example, the computing system 42 may analyze the data from the sensors 20, the driver's responses to the questions from the remote operator (e.g., via voice recognition software), or other information to determine whether to transfer control of the vehicle 12. In such cases, the computing system 42 may provide an indication (e.g., recommendation or instruction) to the remote operator (e.g., via the display) to disconnect, to maintain the connection, or to take over control of the vehicle 12. In some cases, the computing system 42 may block the driver from operating the vehicle 12 and enable the remote operator to control the vehicle 12 (e.g., by activating the dashboard assembly 34). Furthermore, in some embodiments, once the remote operator takes control of the vehicle, the computing system 42 may analyze data that indicates a location of the vehicle 12 (e.g., via a global positioning system [GPS]), the needs of the drivers, and other information (e.g., nearby rest stops or businesses, traffic data, weather data, road construction, contacts for the driver) to automatically determine an appropriate destination, to generate a map or route to the appropriate destination, or to provide instructions to the remote operator to assist the remote operator to control the vehicle 12. In this way, the driving system 10 may actively monitor the driver, block the driver from operating the vehicle in an undesired manner, and assist the driver to reach a destination.

As shown, the computing system 42 may also be communicatively coupled to and receive data from other systems or sources of information, such as one or more data services 44, which may include one or more databases, websites, or information collection organizations, or electronic news outlets that may provide information regarding weather alerts, natural disaster alerts, road construction alerts, traffic alerts, weather conditions, and the like. Generally, the data received from the one or more data services 44 may be processed by the computing system 42, and relevant data may be provided to the remote operator via the display screen 26 of the personal computing system 24 to assist the remote operator to control the vehicle 12, or the relevant data may be utilized by the computing system 42 to assist the remote operator to control the vehicle 12. A map with a route (e.g., recommended or efficient route) may also be provided to the remote operator via the display screen.

While some embodiments enable communication between the remote operator and the driver in response to certain data, it should be appreciated that other data (e.g., data that indicates unconsciousness) may cause the computing system 42 to instruct (e.g., via an audible alarm or text message on the display screen 26) the remote operator to immediately take over control of the vehicle 12. In such cases, the remote operator controls the vehicle 12 using the remote control station 22 prior to initiating or completing communication with the driver. It should also be appreciated that in some cases, the driver may request (e.g., via the console 16) that the remote operator communicate with the driver and/or control the vehicle 12. The driver may make such requests prior to a driving trip or during a driving trip (e.g., while in motion). Thus, the remote operator may control the vehicle 12 in the manner set forth above in response to the request by the driver or in response to the determination that driving control should be transferred. Furthermore, the present embodiments may be adapted to monitor whether the driver is distracted (e.g., the driver may remove their hands from the steering wheel while text messaging), and to enable communications between the remote operator and the driver and to enable the remote operator to control the vehicle 12 in the manner disclosed herein.

As noted above, the vehicle 12 may be an autonomous vehicle, and the vehicle control system 14 may be capable of controlling driving operations of the vehicle 12 as the vehicle 12 travels to a destination. However, regardless of how apt the vehicle control system 14 may be at driving the vehicle 12, the driver may prefer to control the operation of the vehicle 12. Thus, such autonomous vehicles 12 may operate in a non-autonomous mode (e.g., default or standard mode) in which the driver controls operation of the vehicle 12 until the monitored characteristics indicate that driving control should be transferred. In response to determining that driving control should be transferred, the vehicle control system 14 may activate an autonomous driving mode in which the vehicle control system 14 controls operation of the vehicle 12.

Additionally or alternatively, the computing system 42 may enable communication with the remote operator. If the remote operator (or the computing system 42) determines that driving assistance is desired or that driving control should be transferred, the remote operator may monitor operation of the vehicle 12 while the vehicle control system 14 controls the vehicle 12 in the autonomous driving mode. In some cases, the remote operator may work with the vehicle control system 14 to control the vehicle 12. For example, the remote operator may provide an input (e.g., via the input device 28) of a location to the vehicle control system 14 to instruct the vehicle control system 14 to drive to the location. In some cases, the remote operator may view (e.g., via the display screen 26) the images of the area surrounding the vehicle 12 to ensure that the vehicle control system 14 controls the vehicle 12 in an appropriate manner (e.g., to the correct location, following traffic rules, avoiding other vehicles) as the vehicle 12 travels to the location. Thus, the remote operator may be on standby to immediately take over control of the vehicle 12 from the vehicle control system 14 (e.g., to drive to the correct location, to avoid a collision). In this way, the driving system 10 may actively monitor the driver, block the driver from operating the vehicle, and provide autonomous driving that is supervised by the remote operator.

While certain embodiments enable both the autonomous driving mode and communications with the remote operator upon the determination that driving control should be transferred, it should be appreciated that the autonomous driving mode may be more selectively enabled. For example, upon determining that the data indicates that driving assistance is desired, the computing system 42 may enable communications between the remote operator and the driver. Then, upon determining that driving control should be transferred, the remote operator and/or the computing system 42 may enable the autonomous driving mode (e.g., by activating the dashboard assembly 34). In some cases, upon determining that driving control should be transferred, the remote operator and/or the computing system 42 may enable the autonomous driving mode (e.g., by activating the dashboard assembly 34) and the remote operator may remain on standby to take over control of the vehicle 12. It should also be appreciated that the driver may request (e.g., via the console 16) activation of the autonomous driving mode and/or supervision of the vehicle control system 14 by the remote operator. The driver may make such requests prior to a driving trip or during a driving trip (e.g., while in motion). Thus, the vehicle control system 14 and the remote operator may work together to control the vehicle 12 in response to the request by the driver or in response to the determination that driving control should be transferred. Furthermore, the present embodiments may be adapted to monitor whether the driver is distracted (e.g., the driver may remove their hands from the steering wheel while text messaging), and to enable the autonomous driving mode, to enable communications between the remote operator and the driver, and to enable the remote operator to supervise the vehicle control system 14 in the manner disclosed herein.

In some embodiments, the computing system 42 may be configured to determine and/or to adjust an insurance policy for the vehicle 12 when the driving system 10 is utilized during operation of the vehicle 12. For example, upon receipt of a signal indicating that the driver has enabled transfer of data from the sensors 20 to the computing system 42, the computing system 42 may reduce the driver's insurance rate during the driving trip or for the next billing cycle. It should be appreciated that the insurance rate may vary based on any of a variety of additional factors, such as value of the vehicle 12, type of vehicle 12, driving location, and the like.

It should be appreciated that the driving system 10 may include additional or fewer components than shown in FIG. 1. Furthermore, a personal computing device (e.g., mobile phone) of the driver may be utilized for communications between the remote operator and the driver. For example, data from the sensors 20 may be sent directly to the computing system 42 or may be provided to the personal computing device, which may then send the data to the computing system 42. Upon determining that driving assistance is desirable based on the data, the computing system 42 may enable the remote operator to communicate with the driver via the personal computing device (e.g., the computing system 42 may cause an application on the personal computing device to open and convey audible messages to the driver). In some embodiments, the personal computing device of the driver may be used to collect images. For example, the driver may mount the personal computing device on a dashboard of the vehicle 12, and the personal computing device may include an imaging device that obtains images forward of the vehicle 12. The images may then be communicated from the personal computing device to the computing system 42 and the remote-control station 22.

Various components for the vehicle 12, such as the components that enable monitoring of the driver (e.g., the sensors 20), the components that enable collection of data to facilitate remote control of the vehicle 12 (e.g., the imaging devices 18), and/or the components that enable communication between the driver in the vehicle 12 and the remote operator at the remote-control station 22 (e.g., the communication devices 48, the console 16), may be provided as part of a kit that can be mounted or installed within the vehicle 12. Thus, the kit may convert a typical vehicle into the vehicle 12 that may be used in the various manners disclosed herein. Furthermore, it should be appreciated that the remote control station 22 may include multiple components to enable the remote operator to simultaneously interact with multiple drivers, to control multiple vehicles 12, and/or to monitor multiple vehicles 12 (e.g., with respective vehicle control systems 14 in the autonomous driving mode).

The computing system 42, in certain embodiments, may be a cloud-based computing system that includes a number of computers that may be connected through a real-time communication network, such as the Internet. In one embodiment, large-scale analysis operations may be distributed over the computers that make up the cloud-based computing system. Although the computing system 42 is described above as a cloud-based computing system, the computing system 42 may be any suitable computing device that is capable of communicating with other devices and processing data, in accordance with the techniques described herein.

Figure 2:
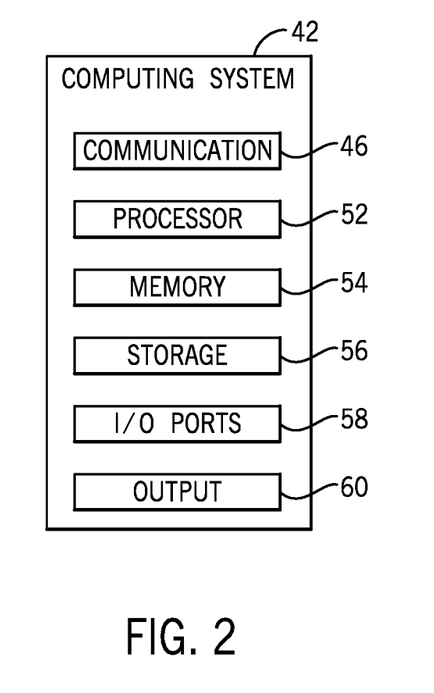
FIG. 2 illustrates a block diagram of components that may be part of a computing system of the driving system of FIG. 1, in accordance with embodiments described herein.

FIG. 2 is a block diagram of example components within the computing system 42. For example, the computing system 42 may include a communication device 46, a processor 52, a memory 54, a storage 56, input/output (I/O) ports 58, an output device 60 (e.g., a display or a speaker), or any of a variety of other components that enable the computing system 42 to carry out the techniques described herein. The communication device 46 may be a wireless or wired communication component that may facilitate communication between the vehicle control system 14, the imaging devices 18, the sensors 20, the remote-control station 22, and the data services 44.

The processor 52 may be any suitable type of computer processor or microprocessor capable of executing computer-executable code. The processor 52 may also include multiple processors that may perform the operations described below. The memory 54 and the storage 56 may be any suitable articles of manufacture that can serve as media to store processor-executable code, data, or the like. These articles of manufacture may represent computer-readable media (e.g., any suitable form of memory or storage) that may store the processor-executable code used by the processor 52 to perform the presently disclosed techniques. The memory 54 and the storage 56 may also be used to store the data, various other software applications, and the like. The memory 54 and the storage 56 may represent non-transitory computer-readable media (e.g., any suitable form of memory or storage) that may store the processor-executable code used by the processor 52 to perform various techniques described herein. It should be noted that non-transitory merely indicates that the media is tangible and not a signal.

The I/O ports 58 may be interfaces that may couple to other peripheral components such as input devices (e.g., keyboard, mouse), sensors, input/output (I/O) modules, and the like. The output device 60 may operate to depict indications associated with software or executable code processed by the processor 52. In one embodiment, the output device 60 may be an input device. For example, the output device 60 may include a touch display capable of receiving inputs from a user of the computing system 42. The output device 60 may be any suitable type of display, such as a liquid crystal display (LCD), plasma display, or an organic light emitting diode (OLED) display, for example. In one embodiment, the output device 60 may depict or otherwise provide the indications described above.

It should be noted that the components described above with regard to the computing system 42 are exemplary components, and the computing system 42 may include additional or fewer components as shown. Additionally, it should be noted that the vehicle control system 14 and the personal computing system 24 of the remote control station 22 may also include similar components as described as part of the computing system 42 (e.g., respective communication devices, processors, memories, storage, ports, output devices) to facilitate the disclosed operation of the driving system 10. With the foregoing in mind, additional details with regard to controlling the vehicle 12 are discussed below with reference to FIGS. 3 and 4.

Figure 3:
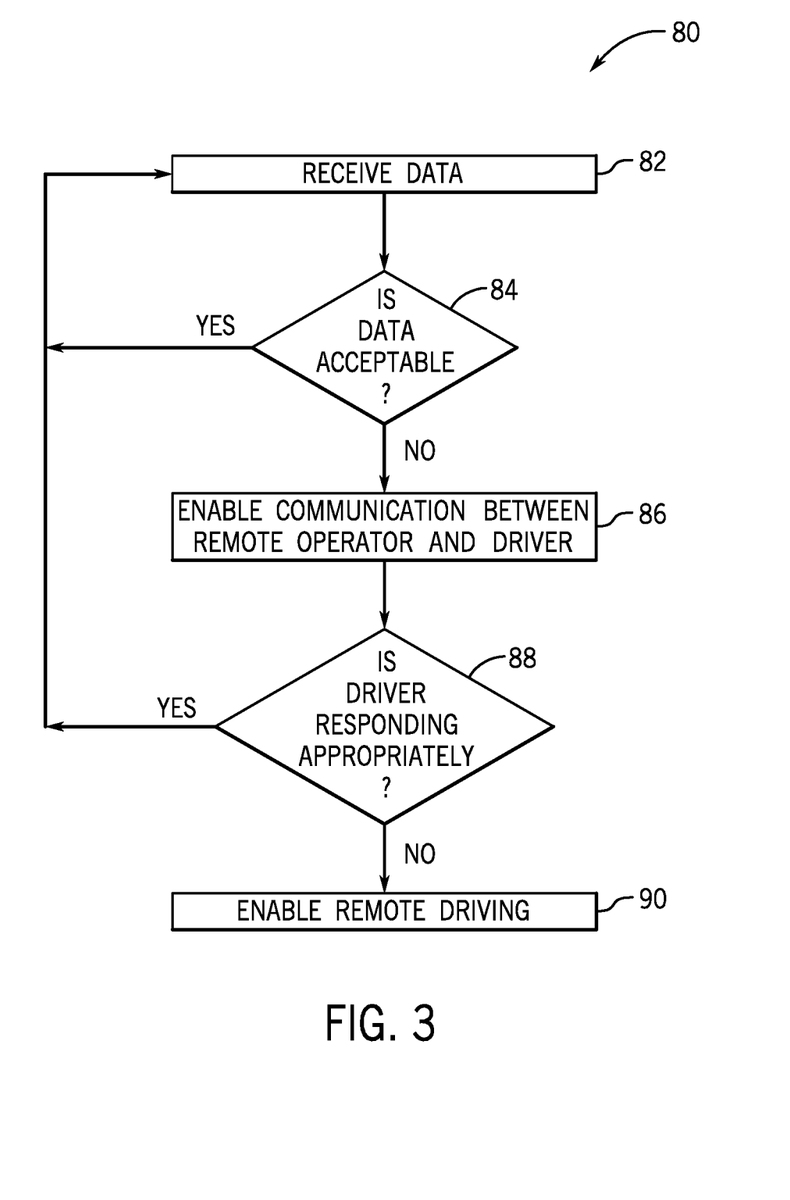
FIG. 3 illustrates a flow chart of a method for transferring control of the vehicle from the driver to a remote operator using the system of FIG. 1, in accordance with embodiments described herein.
Figure 4:
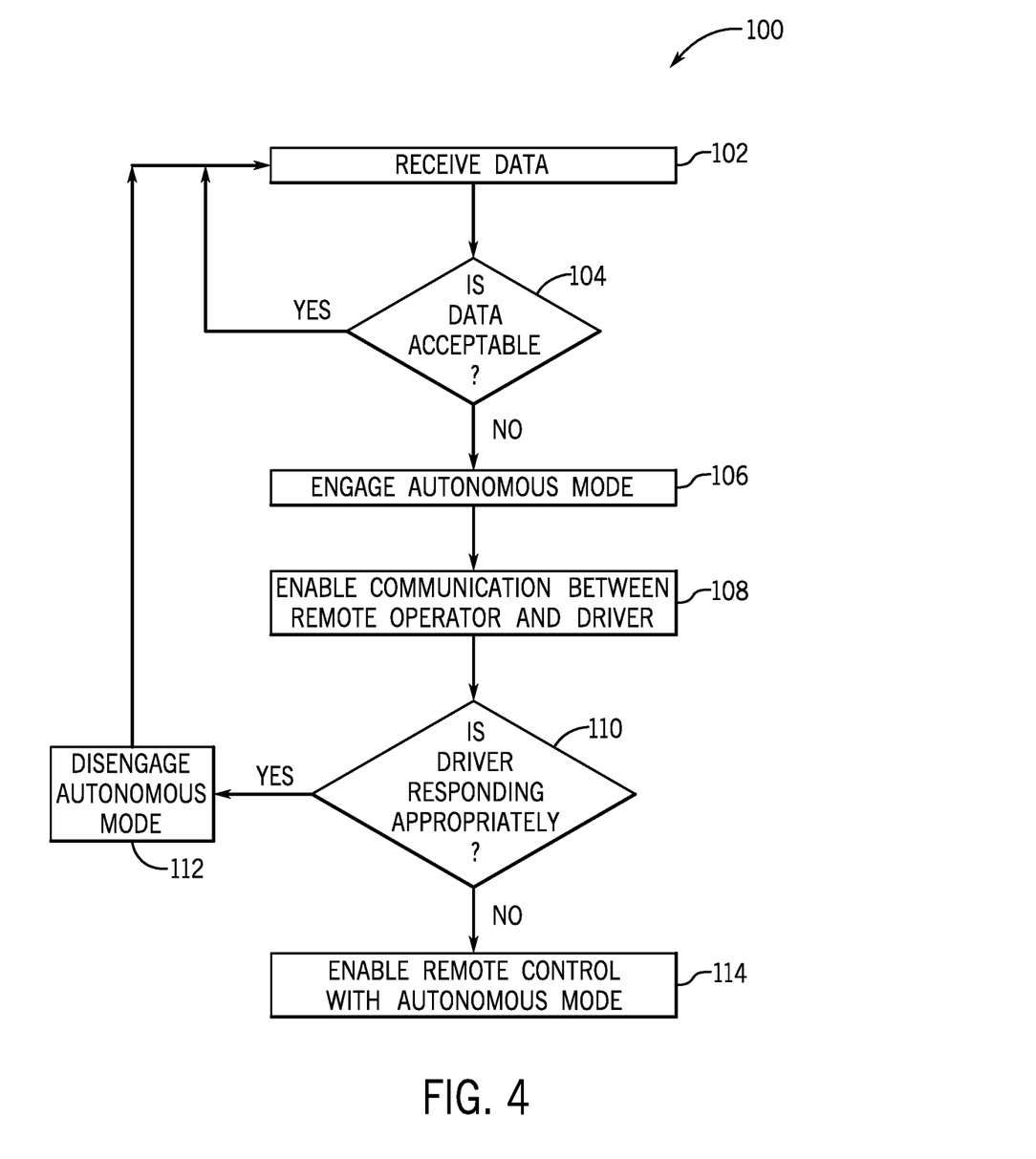
FIG. 4 illustrates a flow chart of a method for enabling an autonomous driving mode of the vehicle using the system of FIG. 1, in accordance with embodiments described herein.

FIGS. 3 and 4 illustrate flow charts of methods for controlling the vehicle 12. The following description of the methods is described as being performed by the driving system 10, but it should be noted that any suitable processor-based device may be specially programmed to perform any or all of the steps of the methods. Furthermore, the steps of the methods may be performed by different processor-based devices. For example, some steps may be performed by the computing system 42, and some steps may be performed by the vehicle control system 14. Moreover, although the steps of the methods are described in a particular order, it should be understood that the steps of the methods may be performed in any suitable order, certain steps may be omitted, and/or other steps may be added.

FIG. 3 is a flow chart of a method 80 of operating the vehicle 12. Generally, the computing system 42 may continuously monitor characteristics indicative of whether driving assistance is desired or whether driving control should be transferred, while the vehicle 12 is operated by the driver (e.g., in a default or standard driving mode). For example, upon determining that driving assistance is desired, the computing system 42 may enable communication between the remote operator and the driver.

Referring now to FIG. 3, at block 82, the vehicle control system 14 may receive data indicative of whether driving assistance is desired or whether driving control should be transferred. For instance, the data may include heart rate data from a heart rate sensor, breathing rate data from a breathing rate sensor, contact or pressure data at the steering wheel from a contact sensor, and/or eye movement data from an imaging sensor. Additionally or alternatively, the computing system 42 may receive vehicle speed data from a speed sensor, pressure data from a pressure sensor within a driver's seat, images from imaging devices 18 that indicate body position or whether the vehicle 12 is staying within a lane, and/or any of a variety of other data that may indicate whether driving assistance is desired or whether driving control should be transferred.

At block 84, the computing system 42 may determine whether the data is acceptable. That is, the computing system 42 may compare the acquired data to corresponding ranges or patterns and/or use one or more algorithms to determine whether the data indicates that driving assistance is desired or that driving control should be transferred. As noted above, in some cases, the ranges or patterns may be calculated based on baseline measurements for the driver.

In response to determining that that the data is acceptable, the computing system 42 may return to block 82 and continue to receive data. However, in response to determining that the data is not acceptable, the computing system 42 may proceed to block 86 and enable communication between the remote driver at the remote control station 22 and the driver. That is, the remote operator may speak a message into the microphone 32 at the remote control station 22, and the message is output via a speaker of the console 16 of the vehicle 12. Similarly, the driver may speak a reply message into a microphone of the console 16, and the reply message is output via the headset 30 of the remote control station 22.

At block 88, the remote operator and/or the computing system 42 may determine whether driving control should be transferred. As noted above, the remote operator may make the determination alone, or the computing system 42 may make the determination and/or generate a recommendation that is provided to the remote operator (e.g., via the display screen 26). In response to determining that the driver should retrain driving control of the vehicle 12, the computing system 42 may return to block 82 and continue to receive data. However, in response to determining that driving control should be transferred, the method 80 proceeds to block 90 and the remote operator may remotely operate the vehicle 12 using the remote control station 22. That is, the computing system 42 may enable the remote operator to control the operation of the vehicle 12 (e.g., by activating the dashboard assembly 34), such that the driver cannot control the operation of the vehicle 12.

FIG. 4 is a flow chart of a method 100 of operating the vehicle 12 that is capable of autonomous driving operations. Generally, the computing system 42 may continuously monitor characteristics indicative of driving control assignment, while the vehicle 12 is operated by the driver (e.g., in a default or standard driving mode). Upon determining that the driving control should be transferred, for example, the computing system 42 may enable an autonomous driving mode and/or may enable communication between the remote operator and the driver.

Referring now to FIG. 4, at block 102, the vehicle control system 14 may receive data indicative of whether driving assistance is desired or whether driving control should be transferred. For instance, the data may include heart rate data from a heart rate sensor, breathing rate data from a breathing rate sensor, contact or pressure data at the steering wheel from a contact sensor, and/or eye movement data from an imaging sensor. Additionally or alternatively, the computing system 42 may receive vehicle speed data from a speed sensor, pressure data from a pressure sensor within a driver's seat, images from imaging devices 18 that indicate body position or whether the vehicle 12 is staying within a lane, and/or any of a variety of other data that may indicate whether driving assistance is desired or whether driving control should be transferred.

At block 104, the computing system 42 may determine whether the data is acceptable. That is, the computing system 42 may compare the acquired data to corresponding ranges or patterns and/or use one or more algorithms to determine whether the data indicates that driving assistance is desired or that driving control should be transferred. As noted above, in some cases, the ranges or patterns may be calculated based on baseline measurements for the driver.

In response to determining that the data is acceptable, the computing system 42 may return to block 102 and continue to receive data. However, in response to determining that the data is not acceptable, the computing system 42 may proceed to block 106 and activate an autonomous driving mode. In the autonomous driving mode, the vehicle control system 14 controls driving operations of the vehicle 12.

Additionally or alternatively, in block 108, the computing system 42 may enable communication between the remote driver at the remote control station 22 and the driver. That is, the remote operator may speak a message into the microphone 32 at the remote control station 22, and the message is output via a speaker of the console 16 of the vehicle 12. Similarly, the driver may speak a reply message into a microphone of the console 16, and the reply message is output via the headset 30 of the remote control station 22.

At block 110, the remote operator and/or the computing system 42 may determine whether driving control should transfer. As noted above, the remote operator may make the determination alone, or the computing system 42 may make the determination and/or generate a recommendation that is provided to the remote operator (e.g., via the display screen 26). In response to determining that the driver should maintain control, the method proceeds to block 112 and the computing system 42 may disable the autonomous driving mode, disconnect communications with the remote operator, and return to block 102 and continue to receive data. However, in response to determining driving control should transfer, the method 80 proceeds to block 114 and the remote operator may work with the vehicle control system 14 to control the vehicle 12. That is, the remote operator may provide inputs the vehicle control system 14, supervise or monitor the vehicle control system 14, and/or be on standby to take over control the vehicle 12 from the vehicle control system 14.

As noted above, other techniques for controlling and/or monitoring operation of the vehicle 12 that is capable of autonomous driving operations are envisioned. In some embodiments, the vehicle 12 may operate in an autonomous driving mode as a default or the driver may choose to operate the vehicle 12 in the autonomous driving mode. In some such cases, it may be desirable for the driver to monitor operation of the vehicle 12 while the vehicle control system 14 controls the vehicle 12 in the autonomous driving mode. For example, it may be desirable for the driver to be on standby to take over control of the vehicle 12. However, if the remote operator (or the computing system 42) determines that the assistance should be provided to the driver (e.g., the data from the sensors 20 indicates that the driver is possibly not monitoring the vehicle 12 appropriately), then communication may be established between the driver of the vehicle 12 and the remote operator at the remote-control station 22 and/or the remote operator may be alerted to begin monitoring the operation of the vehicle 12 while the vehicle control system 14 controls the vehicle 12 in the autonomous driving mode. It should also be appreciated that the driver may request (e.g., via the console 16) supervision of the vehicle control system 14 by the remote operator.

The driving system 10 disclosed herein may be used in any of a variety of situations. The driving system 10 may be used with personal vehicles or with commercial vehicles, such as long-haul trucks and buses. In some such cases, the assistance provided by the driving system 10 may extend the distance over which the vehicle 12 may travel.

In some cases, the driving system 10 may enable the driver to voluntarily release control of the vehicle 12 as a service to a third party. For example, the computing system 42 may receive information (e.g., from the data services 44) about an event (e.g., traffic condition, weather condition), and may provide a notification to the driver to indicate the occurrence of the event and/or to request that the driver release control of the vehicle 12. The driver may then provide an input to release control to the remote operator or to the vehicle control system 14. In some cases, the driving system 10 may be configured to take over control the vehicle 12 as a service to a third party without the driver's permission (e.g., involuntary release of control). These configurations may allow the driving system 10 to efficiently route (e.g., reroute) vehicles 12 away from particular areas (e.g., where events have occurred). For example, the computing system 42 may integrate information from the data services 44, advanced maps, location of the vehicles 12, and location of the event to coordinate the movement of the vehicles 12 to clear the vehicles 12 away from the particular areas or to open certain roads or areas for the passage of other vehicles (e.g., vehicles operated by the third party). Furthermore, in some cases, vehicles 12 for which control has been transferred away from the driver may be linked to one another. For example, the remote operator may control one vehicle 12 (e.g., a lead vehicle or a trail vehicle), and linked vehicles 12 follow at a predefined distance and/or make the same turns, speed changes, or the like.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
 one or more processors configured to:
  receive data from one or more sensors, wherein the data is indicative of one or more characteristics of a driver or an occupant of a vehicle;
  analyze the data to determine the one or more characteristics of the driver or the occupant;

initiate an assessment in response to the one or more characteristics of the driver or the occupant being outside of one or more respective ranges, wherein the assessment comprises one or more questions provided to the driver or the occupant of the vehicle via a speaker within the vehicle;

analyze the data and a response from the driver or the occupant of the vehicle to the one or more questions to determine whether driving control of the vehicle should transfer from the driver;

receive information about the vehicle, wherein the information about the vehicle comprises a type of the vehicle, a location of the vehicle, or both;

select a remote operator from a plurality of available remote operators based on a level of experience of the remote operator with the type of the vehicle, the location of the vehicle, or both;

enable the remote operator to control operation of the vehicle in response to determining that the driving control should transfer from the driver; and receive images of an environment forward of the vehicle from one or more imaging devices coupled to the vehicle and cause display of the images to the remote operator via a display screen of a remote-control station;

wherein the one or more processors are configured to enable the remote operator to control the operation of the vehicle prior to initiating the assessment in response to determining that the one or more characteristics correspond to unconsciousness.

2. The system of claim 1, comprising the one or more sensors, wherein the one or more sensors comprise a heart rate sensor, a breathing rate sensor, or a combination thereof.

3. The system of claim 1, comprising the one or more sensors, wherein the one or more sensors comprise an imaging sensor configured to track eye movement of the driver.

4. The system of claim 1, comprising the one or more sensors, wherein the one or more sensors comprise a contact sensor positioned on a steering wheel of the vehicle, a pressure sensor positioned on a seat of the vehicle, or a combination thereof.

5. The system of claim 1, wherein the one or more processors are configured to enable voice communication between the remote operator and the driver of the vehicle.

6. The system of claim 1, comprising a kit comprising the one or more sensors, the one or more imaging devices, and one or more communication devices that are configured to be coupled to or installed within the vehicle to enable the one or more processors to receive the data from the one or more sensors and to enable the remote operator to control the operation of the vehicle.

7. The system of claim 1, wherein the one or more processors are configured to cause display of a map of an area surrounding the vehicle, a route for the vehicle, traffic data, weather data, road construction data, contacts for the driver, or any combination thereof to the remote operator via the display screen of the remote-control station.

8. A system, comprising:
one or more processors configured to:
receive data from one or more sensors, wherein the data is indicative of one or more characteristics of a driver or an occupant of a vehicle;
activate an autonomous driving mode of the vehicle and initiate an assessment in response to the one or more characteristics of the driver or the occupant being outside of one or more ranges, wherein the assessment comprises one or more questions provided to the driver or the occupant of the vehicle via a speaker within the vehicle;

analyze the data and a response from the driver or the occupant of the vehicle to the one or more questions to determine whether driving assistance is needed;

receive information about the vehicle, wherein the information about the vehicle comprises a type of the vehicle, a location of the vehicle, or both;

select a remote operator from a plurality of available remote operators based on a level of experience of the remote operator with the type of the vehicle, the location of the vehicle, or both; and enable the remote operator to monitor operation of the vehicle in the autonomous driving mode in response to determining that the driving assistance is needed and enable the remote operator to monitor and to control operation of the vehicle in the autonomous driving mode prior to initiating the assessment in response to determining that the one or more characteristics correspond to unconsciousness.

9. The system of claim 8, wherein the data comprises heart rate data, breathing rate data, eye movement data, or any combination thereof.

10. The system of claim 8, wherein the one or more processors are configured to enable the remote operator to control operation of the vehicle in the autonomous driving mode in response to determining that the driving assistance is needed.

11. The system of claim 8, wherein the one or more processors are configured to enable voice communication between the remote operator and the driver of the vehicle.

12. The system of claim 8, wherein the one or more processors are configured to cause display of an image of an environment forward of the vehicle to the remote operator via a display screen of a remote-control station to enable the remote operator to monitor the operation of the vehicle in the autonomous driving mode.

13. The system of claim 8, wherein the one or more processors are configured to enable the remote operator to provide an input to a vehicle control system of the vehicle while the vehicle control system operates the vehicle in the autonomous driving mode.

14. The system of claim 8, wherein the one or more processors are configured to cause display of a map of an area surrounding the vehicle, a route for the vehicle, traffic data, weather data, road construction data, contacts for the driver, or any combination thereof to the remote operator via a display screen of a remote-control station.

15. A method, comprising:
receiving, at one or more processors, data from one or more sensors, wherein the data is indicative of one or more characteristics of a driver or an occupant of a vehicle;
activating, via the one or more processors, an autonomous driving mode of the vehicle based on the data in response to the one or more characteristics of the driver or the occupant being outside of one or more respective ranges;
initiating, using the one or more processors, an assessment after activating the autonomous driving mode, wherein the assessment comprises one or more questions provided to the driver or the occupant of the vehicle via a speaker within the vehicle;

analyzing, via the one or more processors, a response from the driver or the occupant of the vehicle to the one or more questions to determine whether driving assistance is needed;

receiving, at the one or more processors, information about the vehicle, wherein the information about the vehicle comprises a type of the vehicle, a location of the vehicle, or both;

selecting, using the one or more processors, a remote operator from a plurality of available remote operators based on a level of experience of the remote operator with the type of the vehicle, the location of the vehicle, or both;

enabling, via the one or more processors, the remote operator to monitor operation of the vehicle in the autonomous driving mode in response to determining that the driving assistance is needed;

enabling, via the one or more processors, the remote operator to monitor and to control operation of the vehicle in the autonomous driving mode prior to initiating the assessment in response to determining that the one or more characteristics correspond to unconsciousness; and displaying, via a display screen of a remote-control station, an image of an environment forward of the vehicle to the remote operator to enable the remote operator to control or to monitor the operation of the vehicle.

16. The method of claim 15, wherein initiating the assessment comprises enabling voice communication between the remote operator and the driver of the vehicle to enable the remote operator to ask at least one of the one or more questions that are provided to the driver or the occupant of the vehicle via the speaker within the vehicle.

17. The method of claim 15, wherein the data comprises heart rate data, breathing rate data, eye movement data, or any combination thereof.

18. The system of claim 1, wherein the information about the vehicle comprises the type of the vehicle and the location of the vehicle, and the one or more processors are configured to select the remote operator from the plurality of available remote operators based on the level of experience of the remote operator with the type of the vehicle and the location of the vehicle.

19. The system of claim 1, wherein the one or more processors are configured to:
receive an input indicative of approval to release control of the vehicle to the remote operator;
receive a plurality of other inputs indicative of approval to release control of a plurality of other vehicles to other remote operators of a plurality of remote operators; and
provide routing guidance to the remote operator and to the other remote operators to enable the remote operator and the other remote operators to efficiently control the vehicle and the plurality of other vehicles in a coordinated manner.

20. The method of claim 15, comprising analyzing, via the one or more processors, the data and the response from the driver or the occupant of the vehicle to the one or more questions to determine whether driving assistance is needed.

* * * * *

UNITED STATES PATENT AND TRADEMARK OFFICE
CERTIFICATE OF CORRECTION

PATENT NO. : 11,188,074 B1  
APPLICATION NO. : 16/204291  
DATED : November 30, 2021  
INVENTOR(S) : Andy Benavidez et al.

Page 1 of 1

It is certified that error appears in the above-identified patent and that said Letters Patent is hereby corrected as shown below:

On the Title Page

1. In Item (71), under "Applicant", in Column 1, Line 1, delete "UIPCO, LLC, San Antonio, TX (US)" and insert -- United Services Automobile Association (USAA), San Antonio, TX (US) --, therefor.

2. In Item (56), under "OTHER PUBLICATIONS", in Column 2, Line 3, delete "https:/" and insert -- https:// --, therefor.

In the Specification

3. In Column 1, Line 64, delete "indicates" and insert -- indicate --, therefor.

4. In Column 4, Line 25, delete "provide" and insert -- providing --, therefor.

5. In Column 14, Line 33, delete "that that" and insert -- that --, therefor.

6. In Column 15, Line 60, delete "inputs the" and insert -- inputs to the --, therefor.

Signed and Sealed this  
Twelfth Day of April, 2022

Drew Hirshfeld  
*Performing the Functions and Duties of the*  
*Under Secretary of Commerce for Intellectual Property and*  
*Director of the United States Patent and Trademark Office*